UNITED STATES PATENT OFFICE 2,299,878

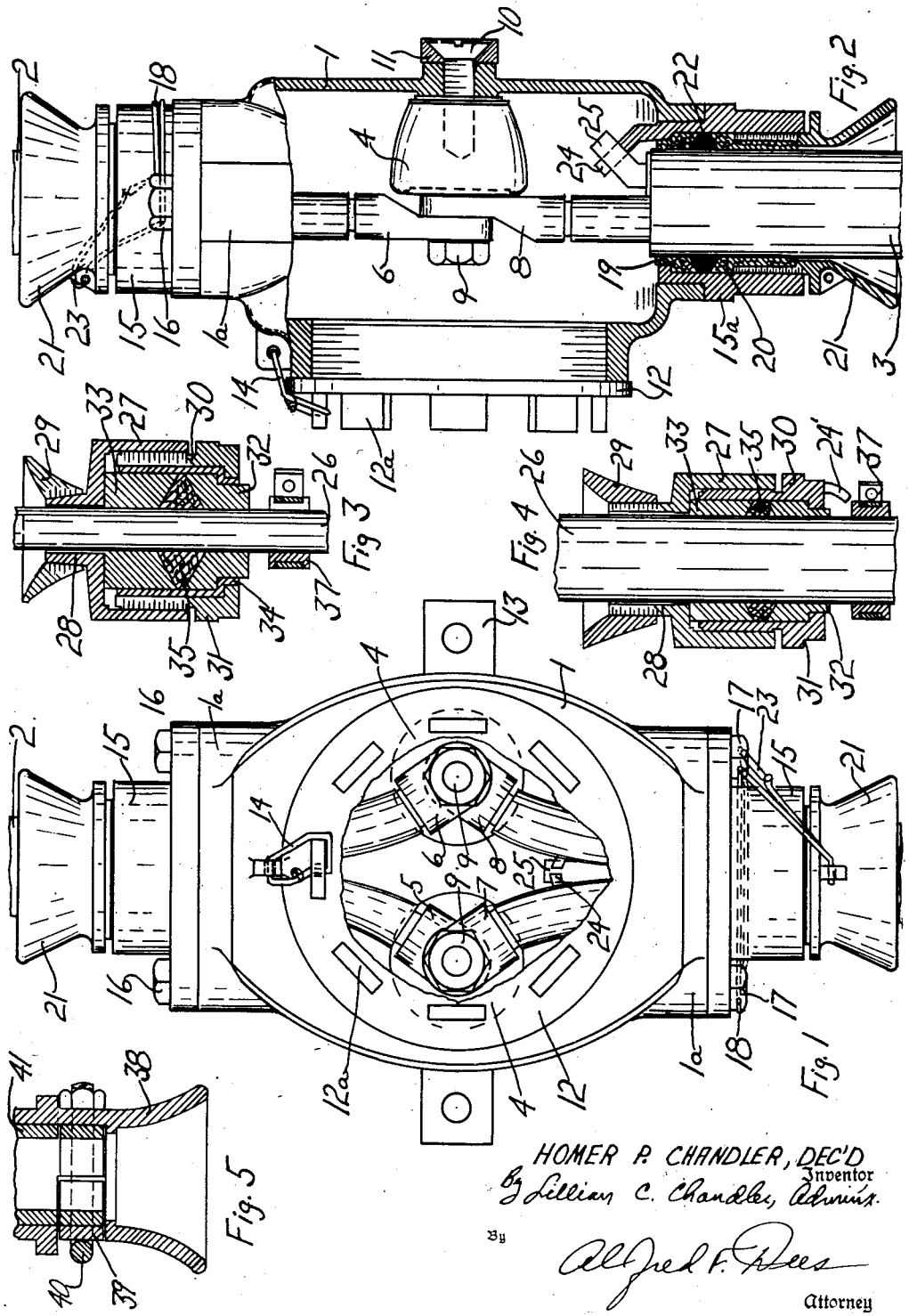

JUNCTION BOX

Homer P. Chandler, deceased, late of Mansfield, Ohio, by Lillian C. Chandler, administratrix, Mansfield, Ohio, assignor to The Ohio Brass Company, Mansfield, Ohio Application November 12, 1941, Serial No. 418,748

2 Claims. (Cl. 174—51)

This invention relates to explosion-proof electric cable glands and more particularly relates to cable-packing glands for junction boxes, switch housings, explosion-proof chambers and similar structures.

The object of this invention is to construct a packed cable inlet gland for a junction box or similar devices.

A further object of the invention is to construct a packed cable inlet gland for a switch, junction box or the like that will confine any possible explosion to the chamber wherein it occurs.

A still further object of the invention is to construct a packing gland for a cable that will resist the force of an explosion and prevent flames, etc. from igniting inflammable substances surrounding the housing in which said gland is mounted.

Other objects are to simplify the construction, decrease cost of manufacture, increase the safety factor and to greatly extend the useful life of the device in which the gland is employed.

Other and further objects will occur to those skilled in the arts to which this invention pertains as the description proceeds, which taken in connection with the accompanying drawing sets forth a preferred embodiment of the invention and selected modifications thereof, but such disclosures are not to be constructed as a limitation of the invention which is limited only by the appended claims and any and all modifications, alterations and variations of structure coming within the spirit and scope thereof are deemed to be included herein.

In the drawing:

Fig. 1 shows an elevational view of one side of a junction box with parts broken away to show details of construction.

Fig. 2 is a side view thereof with parts in section to show details of construction.

Fig. 3 shows a vertical sectional view of a modified packing gland.

Fig. 4 shows a variation of the structure of Fig. 3.

Fig. 5 shows a modification of the cable clamp.

Power transmission cables in mines, powder mills, grist and grinding mills, etc. wherein there is great danger of explosion from sparks, arcs, etc. requires that all cable junctions, fuse clips, switches, etc., to and from which conductor cables are led, to be completely isolated from the atmosphere to thereby prevent sparks, arcs, etc. that might be drawn from affecting the atmosphere external to the housing in which such devices are mounted and confining the explosion or combustion, if any, to the interior of such housing, enclosing the junctions, switches, etc. The hazards of a dust explosion or gas explosion, etc., are thereby sharply reduced since the ignition or detonating of inflammable or explosive mixtures from an electric spark or arc from such cable joints and switches is thereby materially reduced.

The embodiment of the above ideas is set forth in the accompanying drawing in which 1 indicates a housing supporting the terminals of cables 2 and 3 which terminate in appropriate connectors 5, 6, 7 and 8 secured to insulators 4, 4 by means of screws 9, 9 threaded into each insulator 4. Screws (only one of which is shown) 10, whose heads are seated in washers 11 of appropriate composition, hold the insulators 4, 4 in position in the housing 1. A cover 12 is threadably secured in an appropriate aperture in the front of the housing for the purpose of gaining access to the interior of the housing. A bracket plate 13 appropriately apertured is associated with the back of the housing for the purpose of securing same to a fixed support. A lock means 14 has been provided to prevent any unintentional turning of the cover 12. The cover 12 has projections 12a thereon to facilitate rotation thereof and the lock means 14 engages one of the projections 12a as shown.

Removably secured to the upper and lower ends of the housing by screws 16, 16, 17, 17 is a differentially bored coupling 15, appropriately flanged at 15a to receive said screws and threaded into appropriate bosses 1a integrally associated with the housing 1. A lock means 18 is linked in and to the heads of each of the set screws at each end to prevent any but intentional removal from the device.

The coupling interiorly receives two composition bushings 19 and 20, the shoulder of one of which engages a flange collar in the coupling 15 and the latter is engaged by bell mouth 21 threaded into the coupling 15 and which is shouldered to engage a collar flange and one of the ends of bushing 20 to urge same inwardly. Disposed between the two bushings is a compressible packing 22 which upon compression by the bell mouth 21 firmly engages the cable 3 and prevents passage of gas, flame, etc. from the interior to the exterior. A lock means 23 is intended to prevent any but intentional rotation of the bell mouth 21. The adjacent ends of the elements 19 and 20 are concaved, and the packing 22 disposed between these ends, to assist in compressing it and the bushings against cable 3.

Coupling 15 is provided with a U shaped clamp or terminal 24 adapted to receive one end of a grounding cable 25 which provides a safety precaution for the device.

Fig. 3 discloses a modification of the structure set forth in Figs. 1 and 2 in which 26 is a cable passing through and firmly held in a packing gland which comprises a cup-shaped element 27 that is interiorly threaded and which is, also, threaded or corrugated at its reduced end 28 and adapted to receive a bell mouth 29 or a flexible protecting tube (not shown) when the cable is loosely laid on the ground, etc.

The cup-shaped element 27 is further adapted to receive a counter-bored element 30 having a collar or flange 31 thereon adapted to fit flush with the flanged or bossed portion 1a of a junction box or other housing, and is intended to be welded to the flange or bossed portion, instead of bolted thereto as in Figs. 1 and 2.

The interior of the element 30 is bored to receive a pair of compression elements 32 and 33 and also the counter-bored sleeve 34 each of which seat on the flange of element 30 and between the concaved ends of the elements 32 and 33 a quantity of compressible packing material is disposed. The function of the metal sleeve 34 is merely to avoid the use of excessively thick sleeve elements 32 and 33, since the latter are preferably made of an insulating material. Upon rotating 27 and 30 relatively of each other the gasket material 35 is compressed and by reason of the concave ends acts to firmly grip cable 26. The opening in the lower end of element 30 is made quite large and is adapted to receive several sizes of cable ranging in size from that shown in Fig. 3 to that of Fig. 4. When the larger sizes of cable are employed, the metallic sleeve 34 is eliminated. By the use of the construction 30, there need be no changing of that element when different sized cables are used, as all that need be altered or changed is the cup element 27 and the elements 32 and 33. Attention is invited to the fact that elements 19, 20, 32, 33 are slightly compressible aiding further in making the joint gas tight.

In the event the cable 26 should move relatively of the packing gland, a strain relief or stop element 37 is provided about the cable which is adapted to abut against the gland and thereby take the tension off of the insulators 4, 4 or any other element to which the cables are connected.

The structure of Figs. 3 and 4 are extremely flexible, providing for various size cables with a minimum of adjustment, and also providing for quickly and conveniently placing cable 26 within a tube securable to the reduced diameter end 28 of element 27. It is also contemplated that a grounding connection such as 24' may be provided in these glands when desired, it preferably becoming a part of element 30 disposed interiorly of the housing to which it is secured.

Fig. 5 shows a U bolt clamp arrangement to be placed about a portion of the bell mouth 21 of Fig. 1, in which the bell mouth 38 has a severed portion 39 extending partially about the bell mouth 38 and formed by making two partial circumferential and one axial saw-cut therein as shown and over which said U bolt 40 is placed to firmly clamp and securely fasten the bell mouth 38 and liner 41 to a cable passing therethrough. This clamp not only prevents slipping of the cable within the gland but acts to assist in the prevention of leakage as well.

From the foregoing it is apparent that an explosion-proof gland has been perfected which functions as a check valve in that it may allow a certain amount of gases, etc. to slowly enter the housing, but will prevent sudden exiting of the gases such as would be caused by explosions, etc. No part of the glands will permit passage of the explosive gases.

That which is regarded new, novel and useful and which is sought to be protected by Letters Patent of the United States is as follows.

What is claimed is:

1. In a cable packing gland; a cable within said gland; a first member securable to a housing; a second member threaded to said first member; an internal flange on one of said members; a shouldered sleeve member within said members adapted to engage said flange, said sleeve having an internal flange; a fiber sleeve fitted over said cable, one end of which is adapted to abut the wall of one of said members; a second fiber sleeve over said cable, one end of which is shouldered to engage the internal flange of said shouldered sleeve; said shouldered sleeve member and said fiber sleeves interchangeable with other differently bored sleeves adapted to receive differently diametered cables; a packing element disposed between said sleeve elements; and said packing element adapted to snugly engage said cable when said members are relatively rotated.

2. In a gas-tight packing gland for a junction box; a first member securable to a housing; a second member cooperating therewith and threaded thereto; one of said members provided with an internal flange; a sleeve element disposed within said members having a shoulder engaging said flange, said sleeve having an internal flange; a cable passing through said members; a fiber sleeve snugly fitting said cable and engaging the end of one of said members, the other end of said sleeve being cupped; a second fiber sleeve on said cable having one end shouldered to engage said flange with the other end cupped and extending toward the cupped end of said other sleeve; said shouldered sleeve member and said fiber sleeves interchangeable with other differently bored sleeves adapted to receive differently diametered cables; and a packing element between said cupped ends and compressible by the relative rotation of said members to firmly hold said cable.

LILLIAN C. CHANDLER,
*Administratrix of the Estate of Homer P. Chandler, Deceased.*